United States Patent
Ostermeier et al.

(10) Patent No.: US 10,643,040 B2
(45) Date of Patent: May 5, 2020

(54) FREEZE-DRYER PRODUCT SENSOR, DRYING VESSEL AND METHOD FOR OPERATING A FREEZE-DRYER PRODUCT SENSOR

(71) Applicant: Martin Christ Gefriertrocknungsanlagen GmbH, Osterode (DE)

(72) Inventors: Sven Ostermeier, Bad Grund (DE); Michael Umbach, Bad Grund (DE); Martin Dill, Bad Grund (DE); Frank Harms, Osterode am Harz (DE)

(73) Assignee: MARTIN CHRIST GEFRIERTROCKNUNGSANLAGEN GMBH, Osterode (DE)

( * ) Notice: Subject to any disclaimer, the term of this patent is extended or adjusted under 35 U.S.C. 154(b) by 0 days.

(21) Appl. No.: 16/207,507

(22) Filed: Dec. 3, 2018

(65) Prior Publication Data

US 2019/0197269 A1    Jun. 27, 2019

(30) Foreign Application Priority Data

Dec. 21, 2017    (EP) .................................... 17209423

(51) Int. Cl.
*G06K 7/10*        (2006.01)
*G01D 11/00*    (2006.01)
(Continued)

(52) U.S. Cl.
CPC ............ *G06K 7/10366* (2013.01); *F26B 5/06* (2013.01); *F26B 25/22* (2013.01); *G01D 11/00* (2013.01); *G06K 19/0723* (2013.01); *H02J 50/20* (2016.02)

(58) Field of Classification Search
None
See application file for complete search history.

(56) References Cited

U.S. PATENT DOCUMENTS 10,055,618 B1 *  8/2018  Dalgleish ........... G06K 7/10316
2006/0239331 A1  10/2006  Schwegman
(Continued)

FOREIGN PATENT DOCUMENTS

DE    10 2006 019 641 A1    11/2006
DE    20 2009 009 107 U1    11/2009
(Continued)

OTHER PUBLICATIONS

European Office Action in co-pending, related EP Application No. 17209423.7 dated Mar. 9, 2020.

*Primary Examiner* — Kristy A Haupt
(74) *Attorney, Agent, or Firm* — Thomas | Horstemeyer, LLP

(57) ABSTRACT

The invention relates to a freeze-dryer product sensor (1). The freeze-dryer product sensor (1) comprises a transducer (13) for sensing a product parameter and an RFID unit (14). In a storage unit (28) of the RFID unit (14) at least one characteristic parameter (29) specific to the freeze-dryer product sensor (1) is stored.
According to the invention the freeze-dryer product sensor (1) comprises only one single antenna unit (3), which leads to a reduced effort in constructing the freeze-dryer product sensor (1).
The inventive freeze-dryer product sensor may be employed in a drying vessel. The invention also relates to a method for operating such a freeze-dryer product sensor.

17 Claims, 6 Drawing Sheets

(51) Int. Cl.
*H02J 50/20* (2016.01)
*G06K 19/07* (2006.01)
*F26B 5/06* (2006.01)
*F26B 25/22* (2006.01)

(56) References Cited

U.S. PATENT DOCUMENTS

| | | | |
|---|---|---|---|
| 2008/0272131 A1* | 11/2008 | Roberts | G01K 1/024 |
| | | | 220/592.25 |
| 2009/0033462 A1* | 2/2009 | Kitayoshi | G06K 19/0723 |
| | | | 340/10.1 |
| 2009/0175315 A1 | 7/2009 | Schwegman | |
| 2011/0068987 A1* | 3/2011 | Carr | H01Q 1/2225 |
| | | | 343/741 |
| 2015/0346039 A1 | 12/2015 | Ito | |
| 2018/0011502 A1 | 1/2018 | Brower et al. | |
| 2018/0274986 A1 | 9/2018 | Ganguly et al. | |

FOREIGN PATENT DOCUMENTS

| | | |
|---|---|---|
| WO | 2009/030760 A1 | 3/2009 |
| WO | 2016/123062 A1 | 8/2016 |
| WO | 2016/123177 A1 | 8/2016 |

\* cited by examiner

FREEZE-DRYER PRODUCT SENSOR, DRYING VESSEL AND METHOD FOR OPERATING A FREEZE-DRYER PRODUCT SENSOR

CROSS REFERENCE TO RELATED APPLICATIONS

This application claims priority to co-pending European Patent Application No. EP 17 209 423.7 filed Dec. 21, 2017.

FIELD OF THE INVENTION

The invention relates to a freeze-dryer product sensor by means of which it is possible to measure a product parameter of the drying good during a freeze-drying process in a freeze dryer. In the following, reference is preferably made to the realization of the freeze-dryer product sensor as a freeze-drying product temperature sensor, so that the measured product parameter is the temperature of the drying good in the drying vessel. However, the invention also covers embodiments wherein the freeze-dryer product sensor measures a different product parameter (such as e.g. a pressure or a humidity of the drying good).

Preferably, by means of the freeze-dryer product sensor, the product parameter in the freeze-drying product is measured in any drying vessel which can store or contain a freeze-drying product or a plurality of freeze-drying products. To mention only some examples, the drying vessel may be a vial, an accommodating tray or a recess of a supporting surface of the freeze dryer. The freeze-dryer product sensor may be supported by or held at to the drying vessel and a measurement region of the freeze-dryer product sensor may extend into the drying good.

The freeze-dryer product sensor is operated wirelessly. It is possible for the freeze-dryer product sensor to be equipped in a "passive" way (i.e. without its own power supply) with a wireless power supply from an external power supply source.

Furthermore, the invention relates to a drying vessel wherein the drying good can be stored or contained during the freeze-drying process.

Finally the invention relates also to a method for operating a freeze-dryer product sensor.

BACKGROUND OF THE INVENTION

During a freeze-drying process in a freeze dryer the product parameters (in particular the temperature of the drying good in a drying vessel) are an important process parameter. As an example, the temperature of the drying good provides information about the progress of the sublimation process and the drying process of the drying good and the temperature of the drying good can be considered for determining an end of the main drying process and for process control. General information about the process sequence during freeze-drying, about the freeze dryers addressed here and the way the product parameters of the drying good change during the freeze-drying process can be taken from the website www.martinchrist.de.

DE 10 2006 019 641 A1 proposes to sense the temperature of a drying good in a drying vessel via a freeze-dryer product sensor. The freeze-dryer product sensor comprises a sleeve made of metal, glass or ceramics. A measurement transducer arranged in the drying good extends from one end of the sleeve while an antenna extends from the other end of the sleeve. The measurement transducer is connected to the antenna via a circuit board. The freeze-dryer product sensor does not comprise any integrated power supply. Instead, power is supplied via an oscillating circuit of the circuit board, which is excited for executing oscillations in a contact-free way. The resulting oscillation of the oscillating circuit (in particular the frequency of the oscillation) depends on the temperature of the measurement transducer (and so depends on the temperature of the drying good in which the freeze-dryer product sensor is arranged). In a contact-free way, the freeze-dryer product sensor transmits a measurement signal which correlates with the oscillation. The contact-free excitation of the oscillating circuit on the one hand as well as the contact-free transmission of the measurement signal on the other hand are provided by a radio signal transmitted from the antenna of the freeze-dryer product sensor to an antenna arranged within the housing of the freeze dryer. The antenna arranged within the housing of the freeze dryer is connected to a control device arranged outside the housing via a vacuum-sealed feedthrough through the housing. In addition to the measurement signal for the temperature, the freeze-dryer product sensor also transmits sensor identification data and calibration data. In the control device, data sets for the freeze-dryer product sensor have to be provided, which in addition to the current temperature also describes the position of the drying vessel within the housing as well as the measuring object. The measurement signals of the freeze-dryer product sensor can be sampled cyclically by the control device and can be documented as a function of time. By use of a freeze-dryer product sensor of this type it is intended to sense the temperature in a drying vessel, the temperature of a supporting surface, the temperature of an ice condensator of the freeze dryer and/or a temperature in an inlet or outlet of a heating or cooling medium of the freeze dryer. DE 10 2006 019 641 A1 additionally proposes to sense a pressure signal in a corresponding contact-free way. Preferably, due to the contact-free transmission of the signals any wiring within the housing of the freeze dryer and/or of plug connections are no longer required. A shielded realization of the housing of the freeze dryer is also possible. In order to provide an interference-free data exchange between the antennas of the freeze-dryer product sensors and the antenna connected to the control device, DE 10 2006 019 641 A1 proposes to arrange the supporting surfaces of the freeze dryer during the freeze-drying process with a distance from each other which is dimensioned corresponding to the wavelengths of the frequency range used for the wireless transmission. For improving the chemical resistance and/or for reasons of hygiene, the freeze-dryer product sensors can be arranged in the sleeve made of an inert material (e.g. stainless steel, glass, plastic or ceramics). It is also possible that a transducer in a corresponding way senses residual humidity, an electric resistance or a pressure in the drying good and transmits the same in a contact-free way.

DE 20 2009 009 107 U1 discloses a bus system that, in a vacuum-sealed way, is fed through a wall feedthrough of a housing of the freeze dryer from the outside. Bus modules are connected to the bus system in parallel connection or series connection. The bus modules are connected to supporting surfaces, transducers for sensing the temperatures of supporting surfaces, transducers for sensing the electrical resistance of the drying good and/or transducers for sensing the temperatures of the drying good as well as auxiliary parts such as a valve and a ventilating construction unit. The bus system serves for power supply and bi-directional transmission of any information such as measurement data and control data. By means of the bus system it is possible to address the components connected to the bus modules individually and in this way to control them.

WO 2016/123062 A1 discloses a freeze-dryer product sensor for measuring a temperature and a humidity. In the publication, known freeze-dryer product sensors based on wire-based thermocouplers are criticized in that they require a high effort during installation, are prone to errors and might lead to a loss of the drying product in which the freeze-dryer product sensor is arranged. Furthermore, known freeze-dryer product sensors wherein the measuring principle is based on a wireless, induction-based excitation of a resonance frequency depending on the temperature of the drying product are criticized in that when using a plurality of such freeze-dryer product sensors of this type there might be an undesired interaction of the freeze-dryer product sensors. On this background the publication proposes a freeze-dryer product sensor having a plurality of measurement positions where it is possible to measure the temperature and the humidity, the plurality of measurement positions being arranged in an array of the freeze-dryer product sensor in such a way that the measurement positions can be arranged at different heights of the drying product in a drying vessel. A transmission of the measurement signals of the freeze-dryer product sensor is provided by a wireless digital communication link. The freeze-dryer product sensor comprises a supporting structure, which can be arranged in an opening of a vial and held there, as well as a sample body at which the measurement positions are arranged at positions distributed in a longitudinal direction. Furthermore, the freeze-dryer product sensor may comprise a control unit held at the supporting structure and connected to the measurement positions. The measurement positions may comprise ceramic capacitors. The measurement positions may have an extension of 2 mm so that along a measurement line six measurement positions of this type can be arranged over a height of 12 mm. It is also possible for the measurement positions to be integral components of a printed circuit board. Calibration factors for the freeze-dryer product sensors may be stored in the control unit of the freeze-dryer product sensor. For an alternative embodiment it is proposed that the calibration factors for a freeze-dryer product sensor may be stored in a database together with an associated identification code. An access to the database is possible from a processing unit arranged outside the drying chamber. The freeze-dryer product sensor uses a specific identification code in order to identify itself at the processing unit. During the loading of the drying vessels onto the supporting surfaces of the drying chamber, the locations at which the freeze-dryer product sensors are arranged in the drying chamber are determined and archived in table form. In an automatic loading system it is possible to track the vials with the freeze-dryer product sensors arranged therein to the respective position on the supporting surface of the drying chamber. When the measurement signals from the freeze-dryer product sensors are received, the specific identification code is correlated to the position of the identified freeze-dryer product sensor in the drying chamber on the basis of the allocation of the position in table form. In this way it is intended to make possible a "mapping" of the measurement signals received for a drying good for process control and process analysis. It is possible to use "USB ANT" (registered trademark) plugging modules for transmitting measurement signals, which comprise an integrated antenna as well as software for data recording and for control of the data transmission. The freeze-dryer product sensor is wirelessly supplied with power by a transmitter arranged in the drying chamber which transmits a high frequency excitation signal. It is also possible that a plurality of antennas is arranged in the drying chamber for transmitting high frequency signals in order to provide direct and short transmission paths for the high frequency signal. The positions for the arrangement of the vials equipped with the freeze-dryer product sensors can be selected on the basis of data measured before or on the basis of the qualitative characteristics of the drying chamber. The measurement signals at the measurement positions of a freeze-dryer product sensor are transmitted together with the specific identification code of the freeze-dryer product sensor. Based on the measured temperature and humidity, it is possible to control a stream of a heating or cooling fluid into the supporting surfaces or to individual parts of the supporting surfaces. Based on the plurality of measurement positions arranged at different heights in the drying good it is possible to sense the progress of the sublimation front in the drying good during the freeze-drying process, which can then be considered in the process control.

WO 2016/123177 A1 discloses the constructive design of a freeze-dryer product sensor comprising a plurality of measurement positions and measurement principles that can be used in this context.

US 2008/0272131 A1, which is not of the generic kind, relates to a high-volume thermally insulated container in which temperature-sensitive products such as pharmaceutical products, food products, chemical products or biological products are stored or contained during processing, distribution, storage, transport and shipping and are held at a low temperature due to the thermal insulation. A monitoring device serves for monitoring the temperature in the container. The monitoring device comprises an RF transponder, in which way wireless temperature measurement is intended to be enabled without the need to provide an opening of the container. The RF container comprises an RF antenna, a temperature sensor, a battery and an electric circuit. A memory component is intended to enable storage of at least one measurement of the temperature, e.g. a temperature pattern over time. The container is intended for storage of the mentioned products at temperatures below $-70°$ C. or even below $-80°$ C. In order to keep up temperatures below $-70°$ C., the products are arranged in a refrigerant, which may be dry ice. In temperature ranges like that, the battery of the monitoring device may fail, since an electrolyte of the battery may freeze even at a temperature below $-30°$ C. The document suggests arranging the temperature-sensitive battery in a region of the wall of the container, in which the battery due to the temperature rise between the inner side of the wall and the outer side of the wall is exposed to a higher temperature at which the electrolyte of the battery cannot freeze yet. In order to insulate the wall, a polymeric foam (especially with polyurethane, polystyrene, polyolefin or a combination of the mentioned materials) may be used. It is also possible for the wall to be comprised of vacuum isolated panels (VIPs). It is furthermore possible for insulation to be provided by metallic foil layers. The monitoring device may have further functions, such as identifying, monitoring and/or tracking. In addition to the mentioned components, electronic components such as e.g. processors, memory components, external interface components (wired or wireless), sensor elements, display elements such as, e.g., an LCD display, power supplies, transistors, diodes, passive components such as resistors, capacitors and inductors, smart tags, smart cards, RF tags, RFID tags, wireless tags, data loggers and similar may be integrated into the monitoring device. The monitoring device may, additionally, also measure a relative humidity, a light intensity, a voltage, a pressure or vibrations in the container. The monitoring device may be activated by manual actuation of a switch or in a wired or wireless way, e.g. by means of an additional RFID reader.

Further prior art is known from WO 2009/030760 A1 and US 2006/239331 A1.

SUMMARY OF THE INVENTION

The invention relates to a freeze-dryer product sensor for use with a freeze dryer containing drying vessels accommodating a drying good during a freeze-drying process, where the drying good has a product parameter. The freeze drying product sensor is arranged in the drying vessel and therein in contact with the drying good. The freeze-dryer product sensor has at least one characteristic parameter specific to the freeze-dryer product sensor. By means of the freeze-dryer product sensor the product parameter of the drying good can be measured in the freeze dryer during the freeze-drying process. The freeze-dryer product sensor comprises a transducer, which generates a measurement signal for the product parameter, and an RFID unit comprising a storage unit, wherein the at least one characteristic parameter specific to the freeze-dryer product sensor can be stored. Furthermore, the freeze-dryer product sensor comprises an antenna unit, the antenna unit being coupled to the transducer and to the RFID unit. The antenna unit can be used both for a wireless power supply to the transducer, a wireless excitation of the transducer and/or a wireless transmission of the measurement signal of the transducer and for a wireless power supply to the RFID unit, a wireless excitation of the RFID unit and/or a wireless transmission of the characteristic parameter specific to the freeze-dryer product sensor stored in the RFID unit.

Further, the present invention relates to a drying vessel for use in drying a drying good in a freeze dryer during a freeze-drying process, where the drying good has a product parameter. The vessel comprises a drying container with an opening, a stopper by which in a first operating position the opening of the drying container is closed in a fluidically open way and in a second operating position the opening of the drying container is closed in a fluidically sealed way and a freeze-dryer product sensor. The freeze-dryer product sensor has at least one characteristic parameter specific to the freeze-dryer product sensor. By means of the freeze-dryer product sensor the product parameter of the drying good can be measured in the drying vessel and in the freeze dryer during the freeze-drying process. The freeze-dryer product sensor comprises a transducer, which generates a measurement signal for the product parameter, and an RFID unit comprising a storage unit, wherein the at least one characteristic parameter specific to the freeze-dryer product sensor can be stored, and an antenna unit. The antenna unit is coupled to the transducer and to the RFID unit and can be used both for a wireless power supply to the transducer, a wireless excitation of the transducer and/or a wireless transmission of the measurement signal of the transducer and for a wireless power supply to the RFID unit, a wireless excitation of the RFID unit and/or a wireless transmission of the characteristic parameter specific to the freeze-dryer product sensor stored in the RFID unit.

Further, the present invention relates to a method for operating a freeze-dryer product sensor for use with a freeze dryer containing a drying vessel accommodating a drying good during a freeze-drying process, where the drying good has a product parameter. The freeze-dryer product sensor has at least one characteristic parameter specific to the freeze-dryer product sensor. By means of the freeze-dryer product sensor the product parameter of the drying good can be measured in the drying vessel during the freeze-drying process. The freeze-dryer product sensor comprises a transducer, which generates a measurement signal for the product parameter and which exhibits a transient decaying behavior after having been excited, and an RFID unit comprising a storage unit, wherein the at least one characteristic parameter specific to the freeze-dryer product sensor can be stored, an antenna unit, a first line branch and a second line branch, an RFID transmitting and/or receiving unit and a transducer transmitting and/or receiving unit. The antenna unit is coupled to the transducer and to the RFID unit and can be used both for a wireless power supply to the transducer, a wireless excitation of the transducer and/or a wireless transmission of the measurement signal of the transducer and for a wireless power supply to the RFID unit, a wireless excitation of the RFID unit and/or a wireless transmission of the characteristic parameter specific to the freeze-dryer product sensor stored in the RFID unit. The method utilizes an RFID antenna input signal, an RFID antenna output signal, a carrier signal and a transducer excitation signal, which are superimposed in generating a transducer antenna input signal, a transducer excitation signal comprising a transducer excitation frequency, a transducer decay signal, a transducer antenna output signal, and a carrier signal. The RFID antenna input signal is transmitted to excite the second line branch with the RFID unit by means of the RFID transmitting and/or receiving unit and via the antenna unit. The RFID antenna output signal is wirelessly transmitted in order to transmit the at least one characteristic parameter specific to the freeze-dryer product sensor from the second line branch to the or an RFID transmitting and/or receiving unit via the antenna unit. The transducer antenna input signal is transmitted to excite the first line branch by means of the transducer transmitting and/or receiving unit and via the antenna unit. The transducer excitation signal is generated by demodulating the transducer antenna input signal and exciting the transducer with the transducer excitation signal. The excitation of the first line branch is deactivated and in this way the excitation of the transducer with the transducer excitation signal is deactivated. The transducer decay signal is generated on the basis of the transient decaying behavior of the transducer following its previous excitation with the transducer excitation signal. The transducer antenna output signal is generated using the carrier signal to modulate the transducer decay signal into the transducer antenna output signal. The antenna unit is biased with the transducer antenna output signal. Finally, the transducer antenna output signal is wirelessly transmitted from the antenna unit to the or a transducer transmitting and/or receiving unit.

With the novel freeze-dryer product sensor, drying vessel and method for operating a freeze-dryer product sensor it is possible to achieve an advantage in at least one aspect from the group comprising
- the constructional size,
- the constructional effort,
- the costs,
- the efficiency and the signal quality,
- the process automatization,
- the mounting or fixing of the freeze-dryer product sensor on a stopper of a drying vessel,
- the identification of the freeze-dryer product sensor and/or the identification of calibration information such as e.g. calibration coefficients of the freeze-dryer product sensor and/or
- the impedance.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
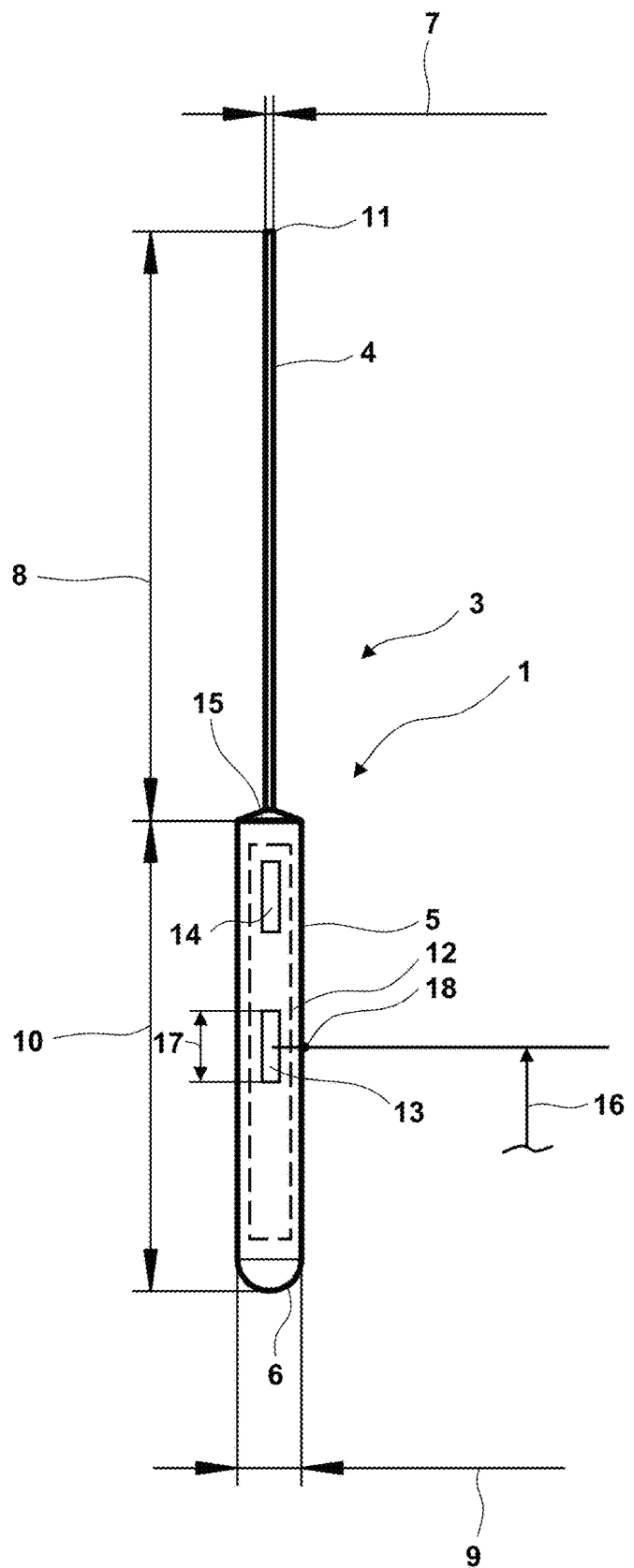
FIG. 1 shows a freeze-dryer product sensor.

It is assumed here that a freeze-dryer product sensor is a sensor associated with a drying vessel used in a freeze dryer that can be employed within the drying vessel in the freeze dryer for monitoring a drying good accommodated in the drying vessel and undergoing a freeze drying process within the freeze dryer. The freeze-dryer product sensor may especially be employed during operation of the freeze dryer. The freeze dryer product sensor may be arranged in direct contact with the drying good. It may especially comprise a measuring surface that is in direct contact with the drying good. The measuring surface may be inserted into a drying vessel or drying container containing the drying good and especially inserted into the drying good, e.g. wholly or partially submerged in the drying good or at least partially covered with the drying good.

According to the invention, the freeze-dryer product sensor is designed for use with a freeze dryer containing a drying good having a product parameter and during a freeze-drying process. The freeze-dryer product sensor has at least one characteristic parameter specific to the freeze-dryer product sensor. By means of the freeze-dryer product sensor the product parameter of the drying good can be measured in the freeze dryer during the freeze-drying process.

Embodiments known from prior art (cp. e.g. WO 2016/123062 A1) are based on the skilled persons' prejudice that for the operation of the sensor (in particular the wireless transmission of the measurement signal of the sensor) on the one hand and for the operation of the RFID unit on the other hand different transmitting and/or receiving units and/or antenna units are required. This prejudice of the skilled persons on the one hand was based on the generally different frequency ranges for the operation of the sensor and for the operation of the RFID units. For that reason separate transmitting and/or receiving units or antenna units have been used which were specifically adapted to the respective frequency ranges. On the other hand, by use of the different frequency ranges for the operation of the sensor and of the RFID unit, in some cases it was intended possibly to provide a separation of the operation of the sensor on the one hand and of an operation of the RFID unit on the other hand.

According to the invention, it is proposed that in the freeze-dryer product sensor a transducer, which generates a measurement signal for a product parameter (in particular a temperature), on the one hand and an RFID unit on the other hand are used, as generally also known from prior art.

The transducer may be based on any concept and measurement principle. To mention only one example of an embodiment of the transducer for measuring a temperature, the transducer may comprise an oscillating circuit (in particular with an oscillating quartz crystal), which by an excitation is excited to execute oscillations. The resonance frequency of the oscillation is dependent on the temperature according to a known dependency. A measurement signal of a transducer designed in this way correlating with the oscillation of the oscillating circuit can then be sent in a contact-free way via an antenna, which in this case forms a transmitter. From the measurement signal transmitted in this way, it is then possible to determine the resonance frequency from which then corresponding to the known dependency of the resonance frequency on the temperature it is possible to determine the temperature.

With respect to the general design, possible constructional embodiments, components and the excitation and communication of, from and with RFID units that can be used within the framework of the invention, reference is made to the website www.wikipedia.de, using the search term "RFID", and standard works and publications related to RFID units, in particular Klaus Finkenzeller: "RFID-Handbuch: Grundlagen und praktische Anwendungen von Transpondern, kontaktlosen Chipkarten und NFC", Carl Hanser Verlag GmbH & Co., 7. Auflage, ISBN: 9783446439436.

The RFID unit here comprises a storage unit wherein at least one characteristic parameter is stored which is specific to the freeze-dryer product sensor.

To mention only some examples that are not intended to limit the present invention, it is possible for the characteristic parameter to be an identification characteristic parameter specifying the respective freeze-dryer product sensor (in the simplest case a consecutive specific number 1, 2, . . . for the different freeze-dryer product sensors).

For an alternative or cumulative embodiment the characteristic parameter may be a calibration parameter which describes a relation between the measurement signal and the product parameter (in particular the temperature). For the aforementioned example of the realization of the transducer with an oscillating circuit comprising an oscillating quartz crystal, a calibration parameter of this type may describe the dependency of the resonance frequency of the oscillating circuit formed with the quartz crystal on the temperature.

For the first time, the invention proposes for the freeze-dryer product sensor to comprise an antenna unit that can be used in a multifunctional way:

a) On the one hand, by means of the antenna unit the transducer is supplied with power in a wireless way, the transducer is excited in a wireless way (which for the realization of the transducer with an oscillating circuit comprising a quartz crystal is an excitation of the oscillating circuit for executing oscillations) and/or the measurement signal is transmitted in a wireless way (which for the design of the transducer with an oscillating circuit comprising a crystal quartz means that the oscillation of the oscillating circuit is transmitted together with the resonance frequency).

b) On the other hand, the same antenna unit is used for supplying the RFID unit with power wirelessly, for exciting the RFID unit wirelessly and/or to allow transmitting the characteristic parameter specific to the freeze-dryer product sensor which is or has been stored in the RFID unit wirelessly.

Accordingly, within the framework of the invention the use of an additional second antenna unit for the aforementioned functions is not required (whereas in some cases a second antenna unit may possibly be provided for other purposes without leaving the framework of the present invention).

Overcoming of the aforementioned prejudice of the skilled persons forming the basis of the present invention is based on the finding that despite the different frequency ranges for the operation of the transducer on the one hand and for the operation of the RFID unit on the other hand a common antenna unit can be used, even if in some cases the commonly used antenna unit can then not be designed or dimensioned in an optimal way for the respective frequency ranges of the transducer and the RFID unit. Here, the inventive multifunctional use of one single antenna unit may have a high efficiency despite the different frequency ranges if the frequencies for the operation of the transducer on the one hand and for the operation of the RFID unit on the other hand are sub- or superharmonic frequencies. Even if this is not the case, the invention purposely accepts a non-optimal design or dimensioning of the antenna unit for the operation of the transducer and/or of the RFID unit in order to reduce the constructional effort involved. Accordingly, it is also possible to design or dimension the antenna unit in such a way that something like an intermediate solution is chosen for a non-optimal, but sufficient operation both of the transducer and of the RFID unit.

However, for one inventive embodiment the antenna unit is dimensioned or optimized for the wireless power supply to the transducer, for the wireless excitation of the transducer and/or the wireless transmission of the measurement signal of the transducer, whereas the antenna unit in some cases is not dimensioned in an optimal way for a wireless power supply to the RFID unit, a wireless excitation of the RFID unit and/or a wireless transmission of the characteristic parameter specific to the freeze-dryer product sensor. This embodiment in particular is based on the finding that an optimized dimensioning of the antenna unit for the operation of the transducer is required because in some cases in the freeze dryer the transducer is arranged remote from a receiving device for the wirelessly transmitted measurement signal and/or a wireless transmission of the measurement signal of the transducer has to be achieved over an angled path, for example between supporting surfaces and/or edges of the supporting surfaces and the housing of the freeze dryer. It is also possible that for the operation of the transducer during the freeze-drying process an input of power in the shape of the excitation of the transducer is intended to be minimized in order not to disturb the freeze-drying process, so that a dimensioning of the antenna unit optimized with respect to the excitation of the transducer may be of advantage. On the contrary, in some cases it is possible that during the supply of the RFID unit of the freeze-dryer product sensor to the freeze dryer the RFID unit is passed closely along a wireless power-supply device, a wireless excitation device and/or a wireless transmission device for the characteristic parameter specific to the freeze-dryer product sensor. Accordingly, the power supply, the excitation or the transmission is also possible for a suboptimal design or dimensioning of the antenna unit. In some cases it is also possible that outside of the freeze dryer, when passing the RFID unit along, comparatively high excitation energies and/or transmission energies can be used, which also makes obsolete a design or dimensioning of the antenna unit optimized for interaction with the RFID unit.

For the type of connection of the antenna unit with the transducer and with the RFID unit, within the framework of the invention there are many different options. It is e.g. possible for a switching unit to be interposed between the antenna unit and the transducer on the one hand and the RFID unit on the other hand. In the case that it is intended to read the specific characteristic parameter from the RFID unit, the switching unit connects the antenna unit to the RFID unit whereas via the switching unit no connection is provided between the antenna unit and the transducer. This switching state of the switching unit will in particular be taken up when a drying vessel with a freeze-dryer product sensor arranged therein is supplied to the freeze dryer in order to identify the freeze-dryer product sensor and in some cases to read the calibration parameter. It is also possible that this switching state of the switching unit is taken up in order to transmit data to the RFID unit (e.g. in the factory or outside of the freeze dryer; e.g. an identification of the freeze-dryer product sensor and/or a calibration parameter). If instead it is intended to operate the transducer for generating a measurement signal for the product parameter (in particular for the temperature), the switching unit is switched in such a way that the antenna unit is connected to the transducer whereas the connection between the antenna unit and the RFID unit is interrupted.

However, it is also possible that the antenna unit is permanently connected to the transducer as well as to the RFID unit, using any kind of connection. For a particular proposal of the invention, the antenna unit is permanently connected to the transducer via a first line branch. Furthermore, the antenna unit is permanently connected to the RFID unit via a second line branch. In this case, a first filter may be arranged in the first line branch. The first filter processes the signal of the antenna unit for the wireless power supply to the transducer, the wireless excitation of the transducer and/or the wireless transmission of the measurement signal of the transducer. In the second line branch, a second filter may be arranged. The second filter processes the signal of the antenna unit for the wireless power supply to the RFID unit, the wireless excitation of the RFID unit and/or the wireless transmission of the characteristic parameter specific to the freeze-dryer product sensor. The design and dimensioning of the first filter and the second filter are chosen in such a way that for an excitation of the antenna unit designated for the transducer, the first filter is open whereas the second filter closes. In a corresponding way, for an excitation of the antenna unit which is designated for the RFID unit, the second filter is open whereas the first filter closes. Here, "closing" does not only mean a complete closure but also covers a transmission behavior which is considerably reduced when compared to the "open" state (e.g. reduced by at least one order of magnitude or reduced by at least a factor of 5 or 10. Within the framework of the invention, the two filters may be embodied as high-pass filters, band-pass filters or low-pass filters. It is also possible that the two filters are embodied as a frequency-separating filter or as a so-called diplexer.

In the following, in order to simplify the description, reference is made to a common use of two freeze-dryer product sensors in a drying chamber of a freeze dryer during a freeze-drying process whereas the same also applies for a larger number of freeze-dryer product sensors being used in a freeze-drying process:

If during a freeze-drying process in a freeze dryer two freeze-dryer product sensors are used in different drying vessels, the transducers in some cases operate in different frequency bands, which are offset with respect to each other without any overlap. With no intention to limit the invention to this example, it is e.g. possible that the resonance frequency of an oscillating circuit of the first transducer in the product parameter range applicable here (in particular in a temperature range of −60° C. to +140° C.) lies in a first frequency band of 170 KHz to 175 KHz while the corresponding resonance frequency of the second transducer lies in a second frequency band of 175 KHz to 180 KHz (without any overlap with the first frequency band). These differing designs of the resonance frequencies are based on different designs of the respective oscillating circuits, which may be accomplished by using different quartz crystals and/or by different electrical components (such as capacitors, inductors and/or resistors) arranged in the oscillating circuits in addition to the quartz crystal. It is possible that for an embodiment of this type the first filters of the two transducers have a differing design, namely for the aforementioned different frequency bands, so that these only let pass frequencies in the respective frequency band. However, this requires that in the freeze-dryer product sensors first filters are used which are specifically adapted to the respective frequency band, which increases the manufacturing effort and the component variety. For a particular embodiment of the inventive freeze-dryer product sensor, the first filter arranged in the first line branch of this freeze-dryer product sensor is dimensioned in such a way that the first filter processes the signal of the antenna unit for the wireless power supply to the transducer, the wireless excitation of the transducer and/or the wireless transmission of the measurement signal of the transducer and could also process the signal of the antenna unit for the wireless power supply to another transducer, the wireless excitation of another transducer and/or the wireless transmission of the measurement signal of another transducer, the two aforementioned transducers operating in different frequency bands. For the aforementioned example this means that in the freeze-dryer product sensor of the transducer as well as of the other transducer one and the same first filter can be used, which is then open for the two different frequency bands, that is, for frequencies in the range of 170 KHz to 180 KHz. For a corresponding higher number of freeze-dryer product sensors being used simultaneously, the band width of the first filter for which the first filter is open has to be chosen correspondingly wider so that the first filter is open for all of the relevant different frequency bands.

There are many options for the specific characteristic parameter stored in the RFID unit. It is e.g. possible for the characteristic parameter to be a calibration factor, which may be a proportionality constant between the product parameter biasing the freeze-dryer product sensor and a characteristic value of the measurement signal (such as e.g. an amplitude or a frequency of the latter). However, it is also possible for the specific characteristic parameter to be a calibration curve, which models a dependency of a characteristic value of the measurement signal, such as e.g. a temperature-dependent resonance frequency, on the temperature. Furthermore, it is possible for the specific characteristic parameter to be a calibration function with a mathematical model of a dependency. The calibration function may e.g. be a polynomial or consist of the relevant coefficients of a polynomial for modeling the dependency. It is also possible that the specific characteristic parameter is a calibration map, so that it is also possible to consider a dependency on further influencing parameters.

Within the framework of the present invention it is possible for the freeze-dryer product sensor to be held at the drying vessel or the stopper of the same by any supporting and holding device. For a particular proposal of the invention, the antenna unit fulfills an additional function in that it directly forms a supporting and holding device for mounting or fixing the freeze-dryer product sensor on a stopper of a drying vessel or in that a supporting and holding device is mounted or fixed on the antenna unit. In some cases, in this way it is possible to reduce the constructional effort for the freeze-dryer product sensor further.

For another embodiment, the invention proposes that the RFID unit is adapted to the base impedance of the antenna unit.

It is possible for the freeze-dryer product sensor to comprise only one transducer, which at a predetermined height or in a predetermined height range can sense the product parameter in the drying good in the drying vessel. However, the invention also proposes that in a freeze-dryer product sensor a plurality of transducers is provided, which are arranged at different heights of the freeze-dryer product sensor. Here, the height relates to the distance of the transducers from the bottom of the drying vessel if the freeze-dryer product sensor is arranged according to the specifications and held in the drying vessel (e.g. in the region of the stopper of the drying vessel). Within the framework of the invention, it is possible to use different antenna units or even the same antenna unit for the plurality of transducers. Preferably, the plurality of transducers of the freeze-dryer product sensor then operate in differing, non-overlapping frequency bands.

For the design of the antenna unit there are many different options. For one proposal of the invention, the antenna unit, being electrically effective and responsible for the wireless transmission, for excitation and for receiving, comprises an elongated antenna and a sleeve, the antenna comprising an e.g. semi-spherical thickening in its end region remote from the sleeve. In the interior of the sleeve passive electronics (in particular a circuit board) of the freeze-dryer product sensor may be arranged. A design or dimensioning of the antenna unit is then achieved by the electrical dimensioning of the antenna and the sleeve.

As mentioned in the beginning, it is generally possible for the transducer to be based upon any measurement principle. For one proposal of the invention, the transducer comprises an oscillating circuit comprising an oscillating quartz crystal. The resonance frequency of the oscillating circuit in this case is dependent on the temperature, which in this case forms the product parameter to be measured. The resonance frequency lies (in particular in the temperature measurement range of interest here, e.g. from −40° C. to 100° C. or −60° C. to 140° C.) e.g. in a frequency band which for one embodiment is in the range from 32 KHz to 67 KHz or for another example lies in the range of 170 KHz to 250 KHz (where the individual, non-overlapping frequency bands lie within the aforementioned ranges for different transducers used simultaneously).

For the excitation frequencies of the RFID unit and/or of the transducer chosen there are many different options within the framework of the invention. For one proposal of the invention, the excitation frequency of the RFID unit is in the band known as "SRD band Europe" or in a band known as "ISM band region 2". In this case, the excitation frequency may in particular be 868 MHz (preferably ±50 MHz, ±30 MHz, ±10 MHz or ±5 MHz) which may e.g. be applicable for freeze-dryer product sensors being designated for the EU or 915 MHz (preferably ±50 MHz, ±30 MHz, ±10 MHz or ±5 MHz) which may e.g. be applicable for freeze-dryer product sensors being designated for the US market.

It is possible that an excitation of the transducer is only provided in the region of the frequency band of this transducer, that is, in the neighborhood of the resonance frequency of the oscillating circuit of the transducer. However, it is also possible that the transducer is excited by a transducer excitation signal wherein a transducer excitation frequency is superimposed with a carrier frequency (e.g. in a so-called ISM band, type B with a carrier frequency in the range of 2.4 GHz to 2.5 GHz).

For one inventive embodiment of the freeze-dryer product sensor, the second filter arranged in the second line branch comprises a filter characteristic such that an RFID antenna input signal is processed by the second filter and in particular passes the second filter if the RFID antenna input signal has an excitation frequency of 868 MHz±20 MHz as well as if the RFID antenna input signal comprises an excitation frequency of 915 MHz±20 MHz. For this inventive embodiment without any modification of the construction being required (at least with respect to the second filter), it is possible to use the freeze-dryer product sensor both for the European market and for the American market.

Furthermore, the invention proposes that in the first line branch and/or the second line branch a modulator and/or a demodulator are/is arranged. This will, as an example, be explained in the following for the first line branch:

If for the excitation of the transducer the antenna unit receives a transducer antenna input signal which is a modulated signal composed of a carrier signal (in particular with a carrier frequency in the range of 2.4 to 2.5 GHz) and a transducer excitation signal, this transducer antenna input signal can be optimized for a good transmission quality from a transducer sending and/or receiving unit to the antenna unit. Furthermore, the modulated signal can purposely be transmitted to the first line branch via a frequency-separating filter or the two filters. By means of a demodulator, the transducer excitation signal is extracted or generated from the transducer antenna input signal. By means of the transducer excitation signal, the oscillating circuit of the transducer can then be excited. In the reverse case that a measurement signal of the transducer (that is, an oscillating signal of the oscillating circuit) has to be transmitted to a or the transducer sending and/or receiving unit via the antenna unit, the transducer response signal or a transducer decaying signal of the transducer can be superimposed with a carrier signal by means of a modulator. The transducer response signal or the transducer decaying signal of the transducer then (after passing the first filter) biases the antenna unit and can be transmitted as the transducer antenna output signal to the transducer sending and/or receiving unit from the antenna unit. Generally, the carrier frequencies for the two different paths can be different. Preferably, the same carrier frequencies are used.

For the design of the modulator and/or demodulator there are many different options known as such by the skilled person. It is e.g. possible for an envelope modulator or envelope demodulator to be used. In a demodulator a rectification or a separation of a positive or negative signal range can be achieved by means of a diode. In the case of using a low-pass dimensioned as required at a position downstream of the diode, in particular a capacitor, the diode charges the capacitor with the signal half-wave with the appropriate direction, whereas for the signal half-wave with the opposite direction the diode closes and the capacitor is discharged slowly or to a non-significant extent (e.g. by a parallel resistor). For an optimal dimensioning of the diode and the downstream low-pass, a demodulator designed in this way generates a continuous (upper or lower) envelope curve from the modulated signal which may then form the transducer excitation signal. With respect to alternative or improved embodiments of a modulator and/or a demodulator reference is made to the embodiments known as such from prior art.

Another solution of the object of the invention is provided in use of a plurality of freeze-dryer product sensors of the aforementioned type, choosing their parameters in a special way. According to this embodiment, the transducer as described before operates in a frequency band unique to the transducer. In the first line branch a filter is arranged which has a design and dimensions that are, on the contrary, not unique to the transducer and that may be shared with at least one filter of another transducer of another freeze-dryer product sensor. The filter may be able to process the signal of the antenna unit for the wireless power supply both of the transducer and of the other transducer, the wireless excitation both of the transducer and of the other transducer and/or the wireless transmission of the measurement signal both of the transducer and of the other transducer. This is illustrated by the following example: A first freeze-dryer product sensor comprises a first transducer, which operates in a first frequency band. Furthermore, a second freeze-dryer product sensor comprises a second transducer. The second transducer works in a second frequency band which differs from the first frequency band without any overlap (cp. the above example). In the first line branches of the first transducer and of the second transducer (first) filters are arranged which have the same design and are dimensioned in the same way. The (first) filters process the signal of the antenna unit for the wireless power supply both to the first transducer as well as to the second transducer, for the wireless excitation both of the first transducer and the second transducer and/or for the wireless transmission of the measurement signal both of the first transducer and the second transducer or are open to this respect. The inventive embodiment allows manufacturing a plurality of freeze-dryer product sensors usable simultaneously with an increased number of interchangeable components, because in the different freeze-dryer product sensors, that may form a set, the same (first) filters can be used without specific adaptions of the filters being required.

Generally, the freeze-dryer product sensor can be brought into interaction with the drying good in any way, which is preferably accomplished in a drying container of any geometry and design. The object of the invention is also solved by a drying vessel for drying a drying good in a freeze dryer equipped with a freeze-dryer product sensor. A drying vessel of this type comprises a drying container and a stopper. In a first operating position (which is preferably taken up during the freeze-drying or main drying), the stopper closes an opening of the drying container in a fluidically open way. If instead the freeze-drying process has ended, the stopper is pressed into the drying container in such a way that the stopper takes up a second operating position wherein the stopper closes the opening of the drying container in a fluidically sealed way. In a drying vessel of this type, a freeze-dryer product sensor of the above-explained type is used. In that context, the freeze-dryer product sensor is preferably mounted or fixed on the stopper by means of the antenna. It is e.g. possible for the antenna to be passed through a bore or an edge-sided groove of the stopper from the interior of the drying container to the outside and then outside the drying container and the stopper to be angled or deflected in such a way that the freeze-dryer product sensor is held at a predetermined height in the drying container.

Another solution of the object of the present invention is a method for operating a freeze-dryer product sensor of the above-described type. In a method of this type, in a first method step a second line branch wherein the RFID unit is arranged is excited via the antenna unit, which receives an RFID antenna input signal (preferably with an excitation frequency in the region of 868 MHz or 915 MHz from an RFID transmitting and/or receiving unit. This excitation is preferably accomplished outside of the freeze dryer. By means of the automatic process control, the freeze-dryer product sensor can be passed closely by the RFID transmitting and/or receiving unit and the RFID antenna input signal can also be sent from the RFID transmitting and/or receiving unit with a high intensity. Due to this excitation, a wireless transmission of at least one characteristic parameter specific to the freeze-dryer product sensor (in particular a calibration factor, a calibration curve, a calibration function, a calibration map and/or an identification parameter) from the RFID unit in the second line branch to the previously used RFID transmitting and/or receiving unit or to another RFID transmitting and/or receiving unit by means of an RFID antenna output signal and via the antenna unit is then possible.

In a second method step, which is preferably executed within the freeze dryer, the product parameter is then measured. For the measurement or for an analysis the previously transmitted specific parameter is used. At first a first line branch is excited by a transducer transmitting and/or receiving unit which generates a transducer antenna input signal, which can be received via the antenna unit of the freeze-dryer product sensor. In the transducer antenna input signal, a carrier signal (in particular with a carrier frequency in the range of 2.4 GHz to 2.5 GHz) and a transducer excitation signal are superimposed. The transducer antenna input signal received in this way by the antenna unit is then demodulated by means of a demodulator. The result of the demodulation is a transducer excitation signal, which comprises a transducer excitation frequency. With the transducer excitation signal, the oscillating circuit of the transducer is then excited for oscillating with the result of forced oscillations. Preferably, an excitation of this type is provided over more than 100, 200, 500, 1000, 2000, 5000, 10000 or even more than 50000 excitation periods, resulting in a forced oscillation of the oscillating circuit. Preferably, the number of excitation periods is chosen such that a transient response to the excitation has decayed.

Subsequently, the excitation of the first line branch is deactivated so that the excitation of the transducer is also deactivated with the transducer excitation signal. Due to the deactivation, a transient decaying behavior of the oscillating circuit of the transducer results.

In the inventive method, a transducer decaying signal of the transducer is then generated on the basis of the transient decaying behavior of the transducer. This transducer decaying signal is then modulated with a carrier signal by means of a modulator, resulting in a transducer antenna output signal. With this transducer antenna output signal, the antenna unit is then biased. Then, the antenna unit wirelessly transmits the transducer antenna output signal from the antenna unit to the previously used transducer transmitting and/or receiving unit or to another transducer transmitting and/or receiving unit.

Figure 6:
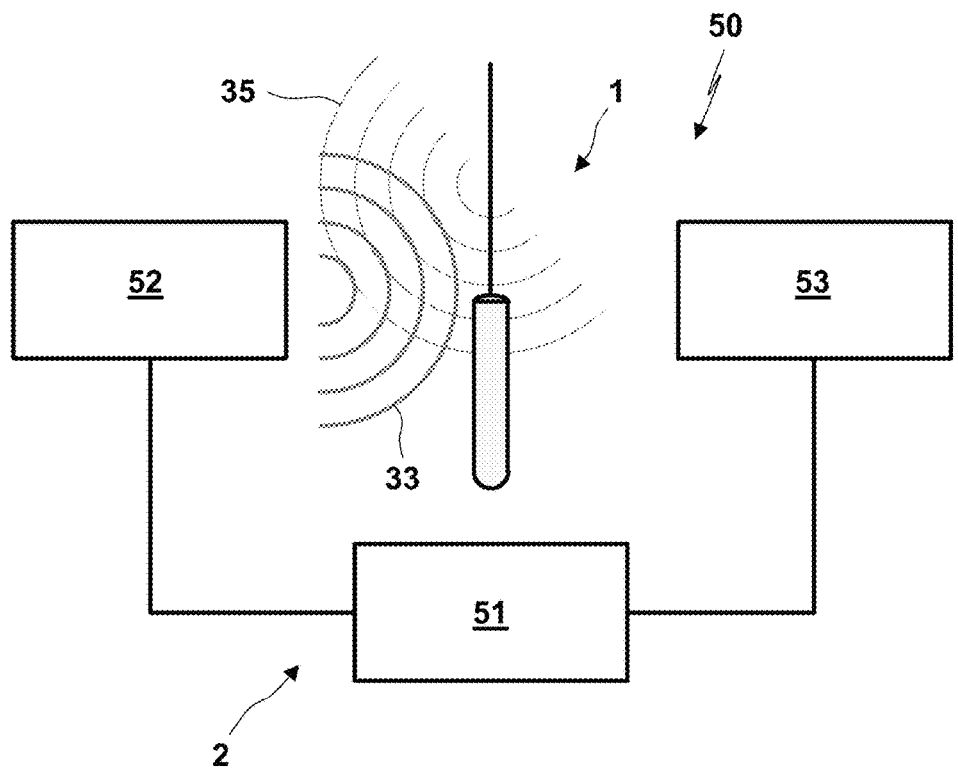
FIG. 6 shows the interaction of a process control with a freeze-dryer product sensor, here for the interaction between the process control with the RFID unit of the freeze-dryer product sensor outside of the freeze dryer.
Figure 7:
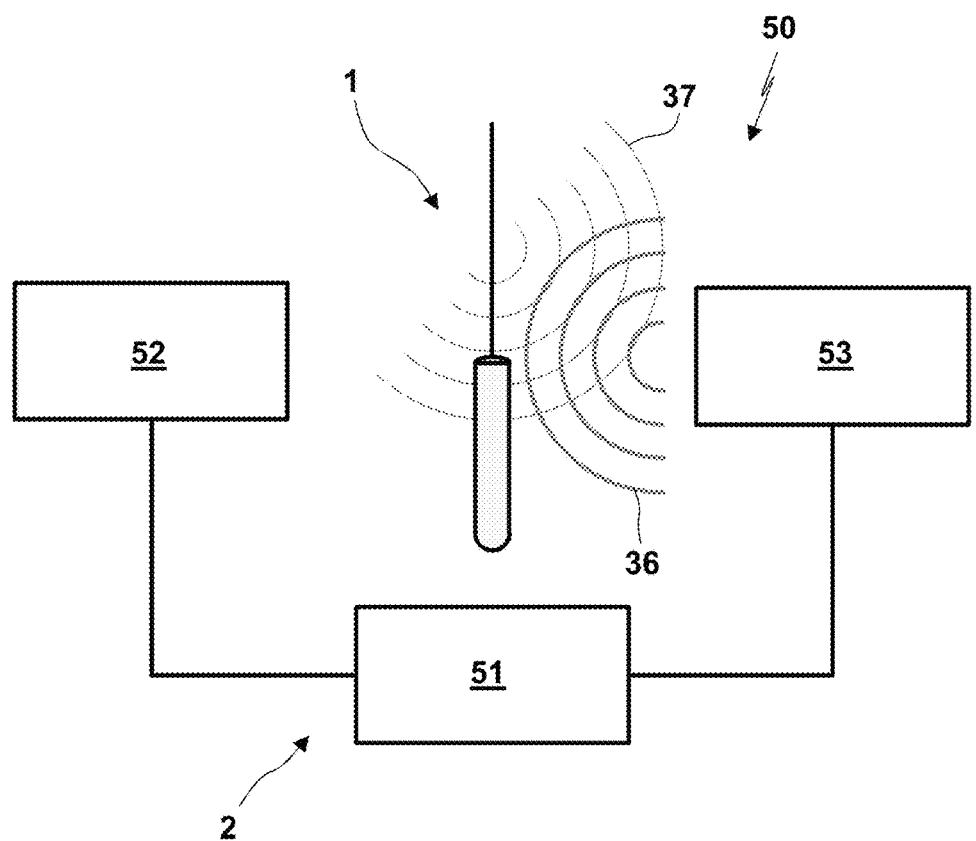
FIG. 7 shows the interaction of a process control with a freeze-dryer product sensor, here with the interaction of the process control with the transducer of the freeze-dryer product sensor within the freeze dryer.

Referring now in greater detail to the drawings, FIG. 1 shows a freeze-dryer product sensor 1. The freeze-dryer product sensor 1 wirelessly communicates with a process control 2 of a freeze dryer (cp. FIGS. 6 and 7). Here, it is possible that the freeze-dryer product sensor 1 is wirelessly supplied with power, so that the freeze-dryer product sensor 1 is a "passive" freeze-dryer product sensor 1.

The freeze-dryer product sensor 1 comprises an antenna unit 3 with an antenna 4 and a sleeve 5. The antenna unit 3 may be a resonant narrow-band antenna or a non-resonant broad-band antenna. The antenna parameters of the antenna unit 3 (e.g. a base resistance, a radiation resistance, an efficiency, an absorption surface, an antenna factor, an effective antenna length) depend both on the antenna 4 and on the sleeve 5. Accordingly, the antenna 4 and the sleeve 5 are directly electrically coupled to each other. The antenna 4 has a rod shape, in particular with a circular cross section. The sleeve 5 has a hollow cylindrical shape. On the side facing away from the antenna 4, the sleeve 5 comprises a bottom 6 having any shape, in particular a semi-spherical shape, whereas the sleeve 5 is generally open on the opposite side.

For an example of the dimensions, the aforementioned components of the antenna unit 3 have the following dimensions:

The antenna 4 has a diameter 7 of 0.35 mm, whereas its length 8 is 25 mm. The sleeve 5 has a diameter 9 of 2.7 mm, whereas its length 10 is 20 mm. However, for this example it is also possible for the diameters 7, 9 and lengths 8, 10 to differ by ±20%, ±15%, ±10% or ±5% from the aforementioned dimensions.

In the following, optional design options for the antenna unit 3 are described: It is, e.g., possible that the tip 11 of the antenna 4 has a semi-spherical shape, comprises a ring or comprises a thickening which is formed by a fusion or surface-fusion of the tip 11. For the antenna 4, a material and dimensioning are chosen such that it is possible to bend the antenna 4 over an edge having a radius of 2 mm with a bending angle of 90° for at least 100 bending cycles. It is possible that the antenna 4 and/or the sleeve 5 have a roughness $R_a$ of 0.4. The antenna 4 and/or the sleeve 5 may be manufactured from stainless steel (e.g. with a material number 1.4404). The whole freeze-dryer product sensor 1 or the freeze-dryer product sensor 1—except for the antenna 4—has a thermal capacity which is preferably smaller than 5 J/gK, 3 J/gK or 2 J/gK and/or a mass which is smaller than 5 g, 3 g, 1 g or even 0.5 g, where any combination of the aforementioned upper limits for the mass and the thermal capacities are also possible.

An electronic constructional unit 12 comprising an electric or electronic control unit is arranged in the sleeve 5. In the constructional unit 12 the electric and/or electronic components are preferably arranged on a circuit board. The constructional unit 12 comprises a transducer 13 and an RFID unit 14. The constructional unit 12, further components and/or connecting cables between the constructional unit 12 and the antenna unit 3 are cast, embedded or encapsulated in the sleeve by a cast socketing 15. As a material for the socketing 15 e.g. an electrically insulating epoxy material can be used.

If the freeze-dryer product sensor 1 is arranged in a drying container, the transducer 13 is positioned at a height 16 above a bottom of the drying container. Here, the length 10 and/or the height 16 are dimensioned in such a way that the antenna 4 freely protrudes from the drying good arranged in the drying container without moistening or contamination. Preferably, the antenna 4 is fed out of the drying container through a bore or a channel between a stopper and the drying container and angled above the stopper by plastic bending, so that the freeze-dryer product sensor 1 is supported at the upper side of the stopper or drying container by the bend.

For the embodiment shown in FIG. 1, the freeze-dryer product sensor 1 comprises only one transducer 13. However, it is generally possible for the freeze-dryer product sensor 1 to comprise a plurality of transducers 13a, 13b, . . . which are then able to sense the temperature in the drying good at different heights 16a, 16b, 16c. It is possible that a transducer 13 senses the temperature at a height 16 or that the transducer 13 comprises a certain extension 17 in height direction in the region of which then the transducer 13 measures an (averaged) temperature. The freeze-dryer product sensor 1 may comprise a visible mark 18 in the region of the outer surface of the sleeve 5. By means of the mark 18, it is indicated to the user at which position of the sleeve 5 the transducer 13 is arranged and so at which position the temperature is measured.

Particularly, the freeze-dryer product sensor 1 can be sterilized by vapor at temperatures of up to 135° C. Here, the materials used are chosen and the cast socket 15 is realized in such a way that a sterilization by vapor is possible over at least 100 cycles. For all of the materials used or of the materials exposed to the environment, materials are used which comprise a FDA certificate while classified as "product contacting".

Figure 2:
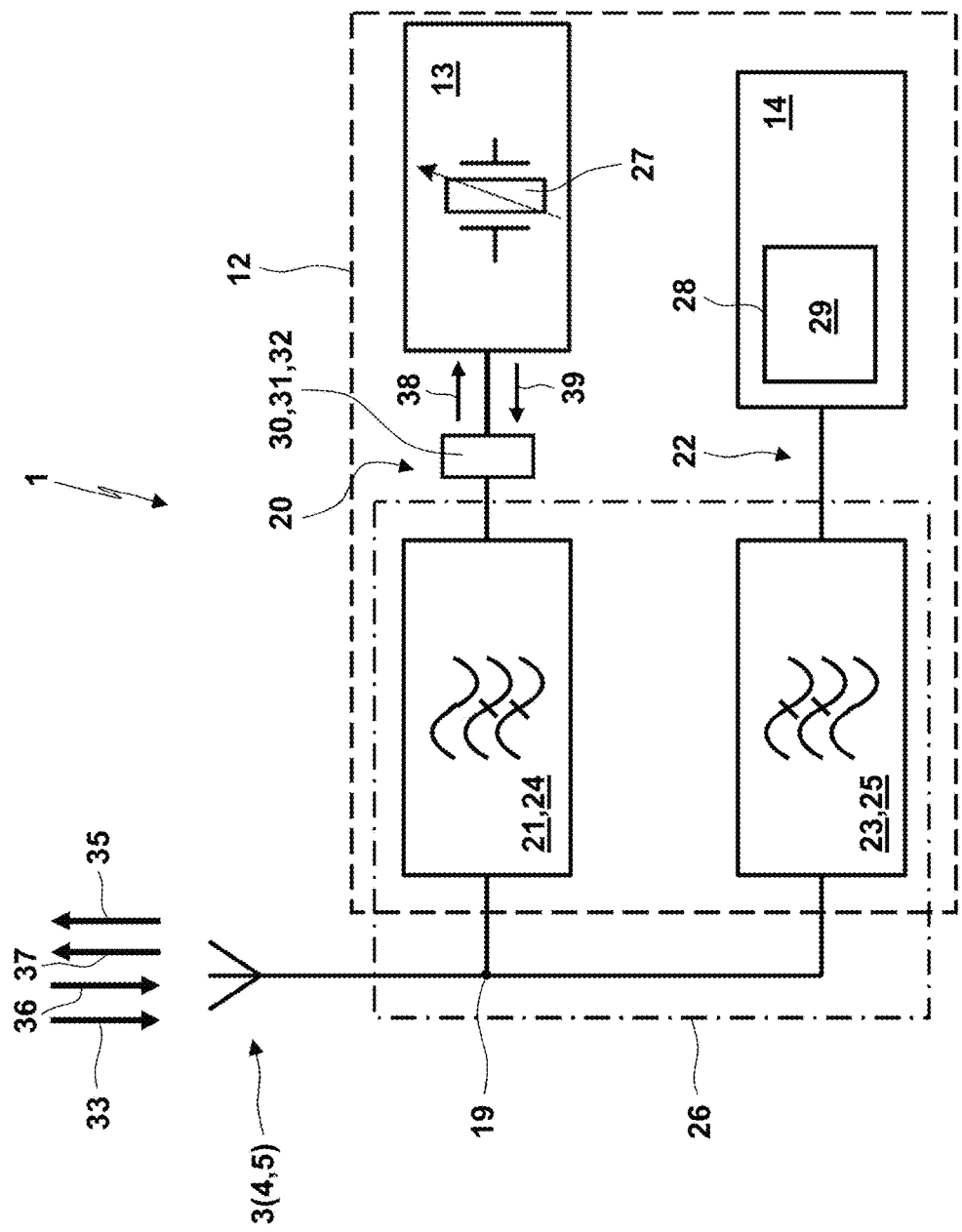
FIGS. 2 and 3 show different schematic diagrams of an electrical design for different embodiments of a freeze-dryer product sensor.

FIG. 2 in a strongly schematized way shows an electrical circuit diagram for the freeze-dryer product sensor 1. The antenna unit 3 is connected to the transducer 13 via a branching point 19 in a first line branch 20 via a first filter 21. Furthermore, the antenna unit 3 is connected to the RFID unit 14 via the branching point 19 in a second line branch 22 via a second filter 23. The first line branch 20 comprises a demodulator 30 (effective in the direction from the antenna unit 3 to the transducer 13) and a modulator 31 (effective in the direction from the transducer 13 to the antenna unit 3). The demodulator 30 and the modulator 31 are preferably arranged between the filter 21 and the transducer 13. It is possible that the demodulator 30 and/or the modulator 31 comprise a diode 32 with a low pass or a capacitor arranged thereafter.

Preferably, the first filter 21 is a high-pass filter 24 whereas the second filter 23 is a low-pass filter 25. The passing frequencies of the high-pass filter 24 and the low-pass filter 25 do not overlap. It is also possible for the filters 21, 23 to be band-pass filters without overlap. Furthermore, it is possible that the branching point 19 and the filters 21, 23 are formed by a frequency-separating filter 26 or a so-called diplexer, the input of which is connected to the antenna unit 3 and the outputs of which are connected to the transducer 13 and the RFID unit 14.

For an optional embodiment, the transducer 13 forms an oscillating system, wherein the oscillating circuit of the transducer 13 is formed with a quartz crystal 27. The resonance frequency of the oscillating circuit due to the temperature dependency of the behavior of the quartz crystal 27 is dependent on the temperature to which the transducer 13 is exposed.

The RFID unit 14 comprises a storage unit 28. In the storage unit 28, a characteristic parameter 29 specific to the transducer 13 is stored.

The characteristic parameter 29 may e.g. be an identification parameter, by means of which a specific transducer 13 from a group of transducers 13a, 13b, . . . of a plurality of freeze-dryer product sensors 1 can be unambiguously identified. An identification parameter of this type may e.g. be a running number or a product number or serial number.

For an alternative or cumulative embodiment, the characteristic parameter 29 may be a calibration parameter. The calibration parameter is related to a dependency of the resonance frequency specific to each of the transducers 13a, 13b, . . . on the temperature to which the transducer 13a, 13b, . . . is exposed. A calibration parameter of this type may e.g. be a calibration factor, a calibration curve, a calibration function (in particular specific coefficients of a function or of a polynomial for a specific transducer 13, for modelling the dependency) or a calibration map.

Figure 3:
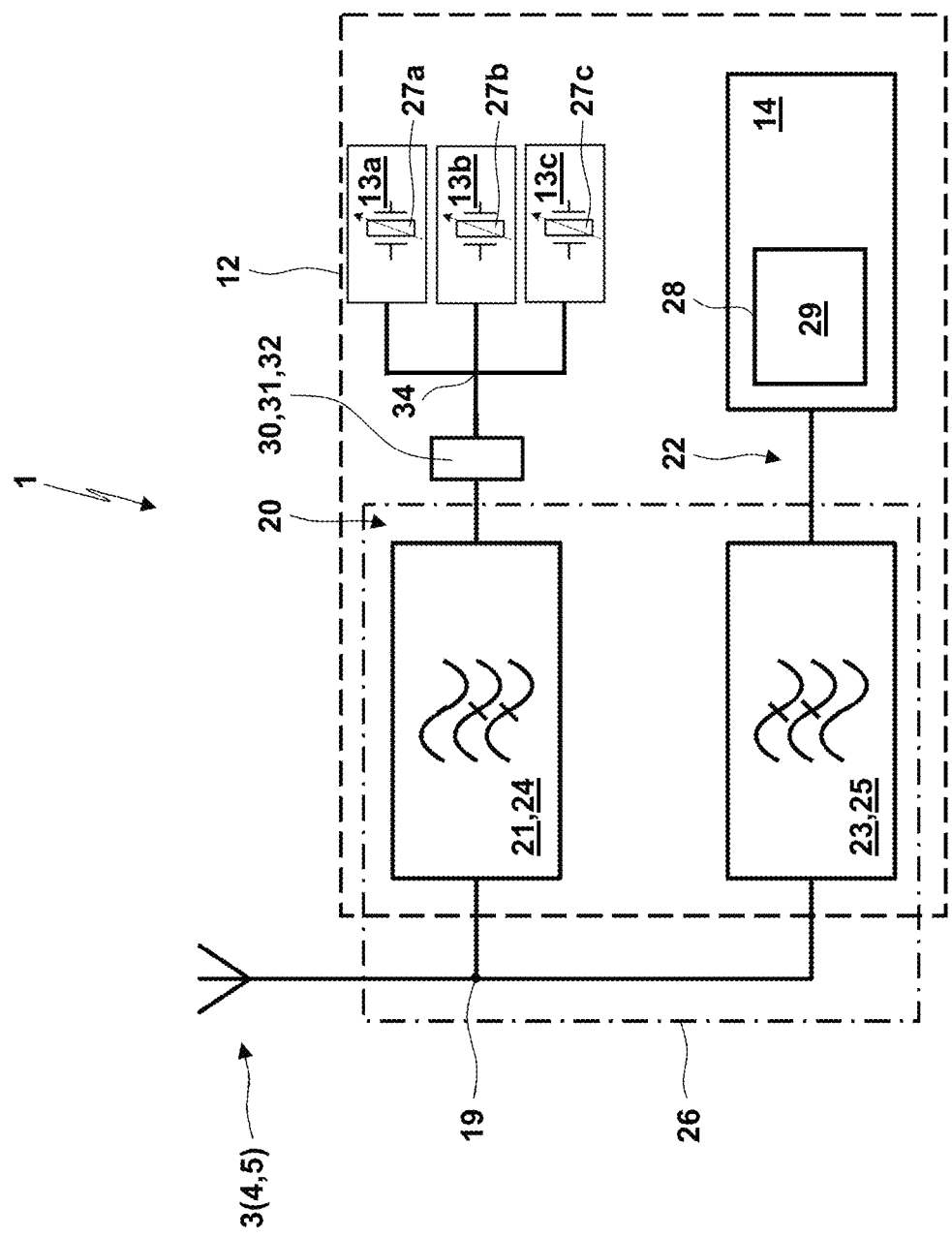

FIG. 3 schematically shows a freeze-dryer product sensor 1, in which via a branching point 34 three transducers 13a, 13b, 13c being effective at different heights 16 are arranged in the line branch 20 in electric parallel arrangement. Here, preferably all of the transducers 13a, 13b, 13c use the same demodulator 30 and the same modulator 31.

Figure 4:
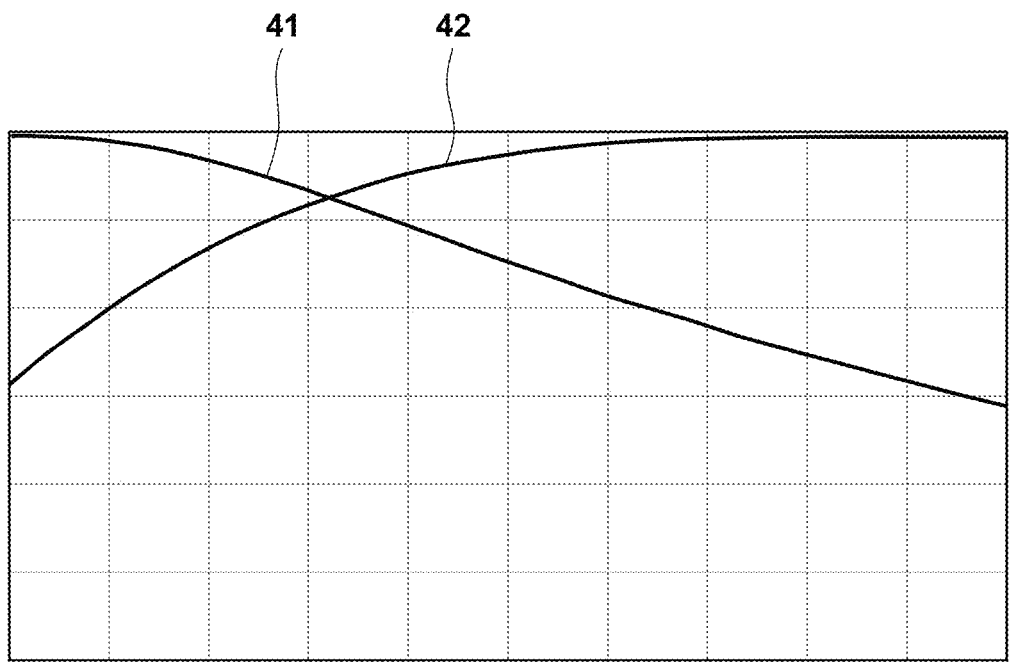
FIG. 4 shows frequency response characteristics of filters that are arranged in front of a transducer and an RFID unit in a freeze-dryer product sensor.

FIG. 4 shows a filter characteristic 41 of the low pass 25 and a filter characteristic 42 of the high pass 24 in the frequency range, where an abscissa with linear scale is used and the minimum frequency shown for the exemplarily mentioned transducer frequencies, carrier frequencies and RFID frequencies may be 800 MHz, whereas the maximum frequency shown may be 3 GHz.

Figure 5:
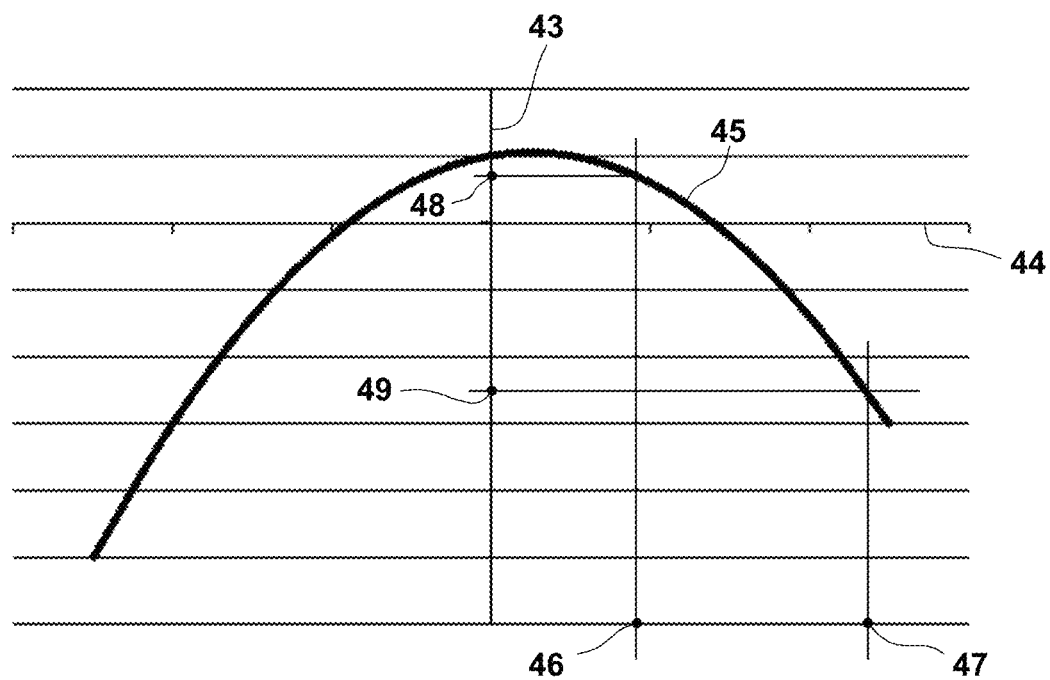
FIG. 5 shows a calibration curve for the dependency of a resonance frequency on a transducer in dependence on the temperature.

FIG. 5 as an example shows a modelling of a dependency of a resonance frequency 43 of the oscillating circuit of the transducer 13 comprising the temperature-sensitive quartz crystal on the biasing temperature 44 by means of a calibration function 45. Here, the calibration function 45 is any function or curve, such as e.g. a second-order polynomial. In this case, the characteristic parameter 29 stored in the storage unit 28 of the RFID unit 14 is at least one coefficient of the polynomial. However, the calibration function 45 here is only used in the function part arranged on the right or left from the vertex.

This can e.g. be explained on the basis of an exemplary measurement region 46. If the freeze-dryer product sensor 1 is used in a measurement range between a minimal temperature 46 and a maximal temperature 47, the resonance frequency 43 in this temperature range changes from a maximal resonance frequency 48 at the minimal temperature 46 in a steady way to a minimal resonance frequency 49 at the maximal temperature 47. Accordingly, the resonance frequencies 48, 49 limit the frequency band of this specific transducer 13. Accordingly, from the calibration function 45 it is possible to determine the respective associated temperature from every resonance frequency that results from the excitation of the transducer 13 via the process control 2. The maximal resonance frequency 48 and the minimal resonance frequency 49 may e.g. be in the range of 32 KHz to 67 KHz or 170 KHz to 250 KHz.

FIG. 6 in a strongly schematic view shows a freeze-drying system 50. The freeze-drying system 50 comprises a (in particular an automatized) supply region, wherein drying vessels (of which some are equipped with a freeze-dryer product sensor 1) are fed into a freeze dryer by conveying means such as conveyor belts, carriages and the like and it comprises the freeze dryer itself in the region of which the freeze-drying process is executed. The process control 2 serves both for controlling the operation in the supply region as well as for the control of the freeze-drying process.

FIG. 6 shows the interaction of the freeze-dryer product sensor 1 of a drying vessel conveyed in the supply region with the process control 2. The process control 2 comprises a central control unit 51, to which an RFID transmitting and/or receiving unit 52 and a transducer transmitting and/or receiving unit 53 are connected. The RFID transmitting and/or receiving unit 52 is arranged in the supply region. The freeze-dryer product sensor 1 is passed along the RFID transmitting and/or receiving unit 52 with a small distance (in particular of less than 50 cm, less than 20 cm, less than 10 cm, less than 2 cm or even less than 1 cm). On the contrary, the transducer transmitting and/or receiving unit 53 is arranged in the freeze dryer, namely in a drying chamber of the same.

When the freeze-dryer product sensor 1 passes through the supply region, the freeze-dryer product sensor 1 is passed closely along the RFID transmitting and/or receiving unit 52. At the moment of the passing of the freeze-dryer product sensor 1, the RFID transmitting and/or receiving unit 52 generates an RFID antenna input signal 33, which in a way further explained in the following allows a reading of at least one characteristic parameter 29 from the storage unit 28 of the RFID unit 14 as well as the transmission of the at least one characteristic parameter 29 to the RFID transmitting and/or receiving unit 52 via an RFID antenna output signal 35, so that the at least one characteristic parameter 29 is available in the control unit 51. Accordingly, by means of the process control 2 it is possible to unambiguously identify the freeze-dryer product sensor 1 being passed along the RFID transmitting and/or receiving unit 52 and in some cases it is also possible to transmit specific calibration parameters. In some cases, the process control 2 also provides a mapping or allocation of the freeze-dryer product sensor 1 identified in this way to the position at which at a later point in time the drying vessel with this freeze-dryer product sensor 1 is arranged in the freeze dryer. The allocation or mapping of the position may be provided in the form of the specification of the supporting surface on which the drying vessel with this freeze-dryer product sensor 1 is arranged. However, it is also possible that it can be additionally specified or mapped at which position on the supporting surface the drying vessel with the freeze-dryer product sensor 1 is arranged.

FIG. 7 shows the interaction between the transducer transmitting and/or receiving unit 53 during the freeze-drying process. The transducer transmitting and/or receiving unit 53 generates a transducer antenna input signal 36, which (in a way further described in the following) excites the oscillating circuit of the transducer 13 for executing oscillations. On the basis of a transducer antenna output signal 37 generated by the transducer 13 and the resonance frequency of the oscillating circuit contained therein, which is dependent on the temperature, it is possible to determine the temperature.

Figure 8:
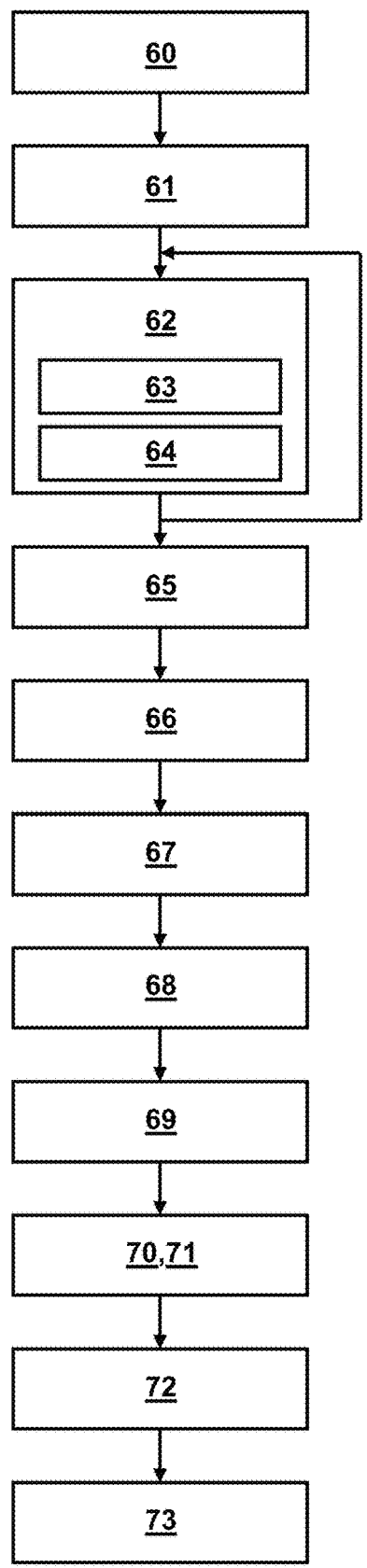
FIG. 8 schematically shows a method for the operation of a freeze-dryer product sensor.

FIG. 8 schematically shows a method for operating a freeze-dryer product sensor 1:

In a method step 60, at least one characteristic parameter 29 is written into the storage unit 28 of an RFID unit 14 of the freeze-dryer product sensor 1. This may be accomplished in the factory when manufacturing the freeze-dryer product sensor 1 or may be accomplished at the site where the freeze-drying system is operated.

In a method step 61, a drying container with the drying good arranged therein is equipped with a freeze-dryer product sensor 1.

In a method step 62, the freeze-dryer product sensor 1 is passed along the RFID transmitting and/or receiving unit 52 in the drying container (in particular by a process control 2 with an automatic loading of the freeze dryer; cp. FIG. 6). In a method step 63, the RFID transmitting and/or receiving unit 52 generates the RFID antenna input signal 33, which is received by the antenna unit 3 of the freeze-dryer product sensor 1. In this way an electric power supply to the RFID unit 14 is provided. On this basis, the RFID unit 14 is enabled to generate the RFID antenna output signal 35 in a method step 62, which is then transmitted to the RFID transmitting and/or receiving unit 52 via the antenna unit 3. In this way, the RFID transmitting and/or receiving unit 52 and the control unit 51 learn which freeze-dryer product sensor 1 is present (on the basis of the identification parameter transmitted with the RFID antenna output signal 35) and/or learn the calibration parameter associated with the specific freeze-dryer product sensor 1 (on the basis of the calibration factor, the calibration curve, the calibration function or the calibration map contained in the RFID antenna output signal 35).

In a method step 65, the freeze dryer is loaded with a number of drying vessels. In the case that a plurality of drying vessels comprise a freeze-dryer product sensor 1, these can each be passed along the RFID transmitting and/or receiving unit 52 in the method step 62, while method steps 63, 64 are executed. Here, the automatic process control and the conveying of the drying vessels assigns the position of the respective drying vessel in the drying chamber of the freeze dryer to the specific identified freeze-dryer product sensor 1.

Before and/or during the freeze-drying process, the temperature is sensed by the freeze-dryer product sensor 1.

For this purpose, in a method step 66, a transducer excitation frequency is chosen or estimated such that the transducer excitation frequency as exactly as possible meets the resonance frequency of the oscillating circuit of the transducer 13. Then, a transducer antenna input signal 36 is generated, wherein a carrier signal having a carrier frequency and a transducer excitation signal having a transducer excitation frequency are superposed.

In a method step 67, the transducer antenna input signal 36 is transmitted from the transducer transmitting and/or receiving unit 53 to the antenna unit 3. The carrier frequency of the transducer antenna input signal 36 is chosen such that in a method step 68 by means of the frequency-separating filter 36 the transducer antenna input signal 36 is fed exclusively or with priority to the line branch 20.

In a method step 69, by means of the demodulator 30 a transducer excitation signal 38 is generated from the transducer antenna input signal 36, by means of which the oscillating circuit of the transducer 13 is biased and excited into forced oscillations.

In a method step 70, the transducer antenna input signal 36 is switched off. This results in the oscillating circuit of the transducer 13 decaying, in which way the transducer 13 in a method step 71 generates a transducer decaying signal 39.

In a method step 72, the transducer decaying signal 39 by means of the modulator 31 is transformed into a transducer antenna output signal 37 by superimposing a carrier signal to the transducer decaying signal 39.

In a method step 73, the transducer antenna output signal 37 is transmitted from the antenna unit 3 to the transducer transmitting and/or receiving unit 53. Due to the fact that the frequency of the transducer decaying signal is contained in the transducer antenna output signal 37, the resonance frequency and, following from that, the temperature can be determined by the process control 2 from the frequency of the transducer decaying signal.

During the freeze-drying process it is possible to repeatedly (in some cases after small time intervals and/or at defined events of the freeze-drying process) measure the temperature.

Preferably, the carrier frequency for the transducer antenna input signal 36 and for the transducer antenna output signal 37 is in the range of 2.4 GHz to 2.5 GHz, whereas the transducer excitation frequency, and therefore the resonance frequency of the oscillating circuit of the transducer 13 as well, lies e.g. in the range of 32 KHz to 67 KHz or 170 KHz to 250 KHz. The high-pass filter 24 is open for the transducer antenna input signal 36 and the transducer antenna output signal 37 whereas the low-pass filter 25 blocks these signals.

Preferably, the RFID antenna input signal 33 and the RFID antenna output signal 35 comprise a frequency of 868 MHz or 915 MHz, where deviations of ±5% or ±10% of these frequencies are also possible.

The choice of the transducer excitation frequency in the method step 66 is of particular importance. If a transducer excitation frequency is chosen which differs from the temperature-dependent resonance frequency of the oscillating circuit of the transducer 13 to a too large extent, the oscillating circuit undergoes oscillations having a small amplitude. This has as a consequence that the transducer antenna output signal 37 does not contain a significant signal in the form of the transducer decay signal 39. Accordingly, it is possible that by a variation of the transducer excitation frequency there is scanning in the way that the resonance frequency is "searched" for, which can be detected if a significant transducer decay signal 39 (in some cases with an amplitude above a predetermined threshold value) results. If once an appropriate transducer excitation frequency has been chosen, starting from this transducer excitation frequency it is then possible to "follow" the temperature-resonance frequency-curve during the freeze-drying process. It is e.g. possible that the resonance frequency of the oscillating circuit of the transducer 13 changes by 15 Hertz for each Kelvin, whereas in some cases the oscillating circuit has a damping so small that for achieving forced oscillations with a sufficient amplitude an excitation in the neighborhood of the resonance frequency of ±2 to 3 Hz is required. It is possible that for the choice of the transducer excitation frequency an estimated value or an empirical value is determined from the freeze-drying process.

Further importance lies in the choice of the carrier frequency in the transducer antenna input signal 36 and the transducer antenna output signal 37. Here, in some cases, for common bandwidths of carrier signals prescribed by law a hopping of the carrier frequency may be required in order to guarantee an even distribution of the use of the band.

For an alternative or cumulative embodiment it is also possible that the carrier frequency is changed in order to provide a good efficiency and a good signal strength despite changing process conditions. Accordingly, it is e.g. possible that due to deformations due to the temperature the transmission paths of the transducer antenna input signals 36 and the transducer antenna output signals 37 change, so that an optimal signal transmission between the antenna unit 3 and the transducer transmission and/or receiving unit 53 requires a change of the carrier frequency. It is possible that in the process control 2 a list of carrier frequencies which have shown to be very effective is stored. In this case, a variation between the individual frequencies stored in the list may occur when searching for the frequency leading to the highest signal strength. It is possible that a list of this type is adapted during a single freeze-drying process or during subsequent freeze-drying processes by searching further advantageous frequencies differing from the frequencies stored in the list at defined points in time via a random generator or by use of a search strategy. If then a frequency in fact shows to be effective, the list of the stored frequencies is extended or a stored frequency is exchanged for the new frequency.

It is intended that during the freeze-drying process the drying good in the drying container is biased with as little power of the transducer antenna input signals 36 and the transducer antenna output signals 37 as possible. It is also possible that a power control of the transducer transmitting and/or receiving unit 53 is performed in the way that the transducer transmitting and/or receiving unit 53 only generates a transducer antenna input signal 36 guaranteeing a sufficient signal strength of the transducer decaying signal 39 or the transducer antenna output signal 37, respectively.

It is possible that the filters 21, 23 contribute to the adaption of the impedance of the antenna unit 3. By the impedance provided by means of the filters 21, 23, it is accordingly possible to compensate for a difference of the base impedance between the line branches 20, 22.

If in a freeze dryer a plurality of freeze-dryer product sensors 1a, 1b, 1c, . . . is used during the freeze-drying process, the freeze-dryer product sensors 1a, 1b, 1c, . . . (within the previously specified bands for the transducer resonance frequencies) comprise different, non-overlapping frequency bands for the resonance frequencies of the transducers 13a, 13b, . . . . On the basis of the identification of the respective freeze-dryer product sensors 1a, 1b, 1c, . . . , it is possible to determine the frequency band associated with the specific freeze-dryer product sensor 1 for each respective transducer 13a, 13b, 13c in the control unit 51. Accordingly, then the transducer transmitting and/or receiving unit 53 is able to generate successively transducer excitation signals in the different frequency bands for sensing the different temperatures and then the determined resonance frequency can be assigned to the specific freeze-dryer product sensor 1a, 1b, . . . and therefore also to the position of the drying vessel in the freeze dryer. However, it is also possible that the frequency band of the freeze-dryer product sensor 1 is stored in the storage unit 28 of the RFID unit 14 as a characteristic parameter 29 and read from the RFID transmitting and/or receiving unit 52.

Preferably, the transducer 13 at least has a measurement range for the temperature from −60° C. to +140° C., where the precision may e.g. be ±0.5 K. The RFID unit 14 may comprise a storage unit 28 with a storing capacity of at least 56 Bit. In the storage unit 28, a serial number, coefficients of a calibration function 45 and a quality index may be stored where this data may also be stored in encrypted form. It is possible that the excitation of and the reading from the RFID unit 14 occurs during the conveying movement of the drying vessel with the freeze-dryer product sensor 1 or that the conveying movement is stopped for the excitation and the reading.

Preferably care is taken that there is no mutual influencing or interaction of the measurement operation of the transducer 13 on the one hand and the reading operation of the RFID unit 14 on the other hand. It is e.g. possible that a transmission between the RFID unit 14 and the RFID transmitting and/or receiving unit 52 may be directed such that the transmission is not directed towards a door of the freeze dryer. It is e.g. also possible that a window or a door of the freeze dryer is equipped with an addition, a layer or a coating having a reduced radiation transmissibility as disclosed in the European patent application EP 3 070 425 A1.

It is possible that the RFID transmitting and/or receiving unit 52 is a conventionally available UHF RFID writing/reading device according to standard EPCglobal v1.2.0. As the RFID unit 14, in particular an RFID chip "NXP Semiconductor SL3S1013FTB0" can be used.

For a special embodiment of the invention, the RFID unit and the transducer 13 are read out simultaneously. For this purpose, in particular, a suitable circuit design and dimensioning is chosen so that the simultaneous reading is possible without a reciprocal interaction.

The effective length of the antenna unit 3 is dimensioned for half the wavelength for the biasing of the transducer 13 with the transducer frequency. However, it is also possible that the effective wavelength of the antenna unit 3 is dimensioned to one fourth of the wavelength. The RFID unit 14 is adapted by circuit technical measures to the resulting base impedance of the antenna unit 3.

It is also possible that a glass bead has been fused or surface-fused onto the tip 11 of the antenna 4. Furthermore, it is possible that the operator via an operating field or array inputs at which position an identified freeze-dryer product sensor 1 is arranged in the freeze dryer.

It is also possible that the RFID unit 14 is not only excited by the RFID transmitting and/or receiving unit 52 and read by the same. Instead, it is also possible that the RFID transmitting and/or receiving unit 52 writes on the RFID unit 14. It is e.g. possible that over a plurality of cycles of use of the freeze-dryer product sensor 1 the number of transducer cycles that the freeze-dryer product sensor 1 has run through is stored in the RFID unit 14. When reaching a predetermined number of admissible transducer cycles, via the process control 2 and by means of a corresponding warning to the operator, the indication can then be given that the freeze-dryer product sensor 1 has reached its predetermined lifetime and an exchange is required. Here, a cycle denotes every use of a freeze-dryer product sensor 1 in a freeze dryer during one freeze-drying process where within a cycle of this type it is also generally possible that a number of temperature measurements is performed.

In the description of the figures, preferably reference is made to the embodiment of the freeze-dryer product sensor as a freeze-drying product temperature sensor, so that a transducer of the freeze-dryer product sensor senses the temperature of the drying good as the product parameter. However, the invention is not limited to this embodiment. Instead, by means of the inventive freeze-dryer product sensor it is possible to measure any product parameter (in particular also a pressure and/or a humidity). In the case that the product parameter is not a temperature, the characteristic parameter 29 in a corresponding way incorporates the dependency of the measurement signal from the product parameter which in this case is not the temperature.

For the sending of the transducer antenna input signal 36, the sending of the RFID antenna input signal 33, the receiving of the transducer antenna output signal 37 and the receiving of the RFID antenna output signal 35 in the freeze dryer and its process control 2, the same transmitting and/or receiving unit can be used or at the same position or at different positions different transmitting and/or receiving devices can be used. It is e.g. possible that adjacent to different supporting surfaces of the freeze dryer a plurality of transmitting and/or receiving devices are arranged in order to keep the transmission paths to the antenna units 3 of the drying vessels arranged on the supporting surfaces as short as possible and/or in order possibly to avoid multiple angled transmission paths.

Many variations and modifications may be made to the preferred embodiments of the invention without departing substantially from the spirit and principles of the invention. All such modifications and variations are intended to be included herein within the scope of the present invention, as defined by the following claims.

We claim:

1. A freeze drying vessel for use in drying a drying good having a varying product parameter in a freeze dryer during a freeze-drying process with
  a) a vial containing the drying good and having an opening,
  b) a stopper by which
    ba) in a first operating position the opening of the vial is closed in a fluidically open way and
    bb) in a second operating position the opening of the vial is closed in a fluidically sealed way and
  c) a freeze-dryer product sensor having at least one characteristic parameter specific to the freeze-dryer product sensor, where by means of the freeze-dryer product sensor the product parameter of the drying good can be measured in the vial during the freeze-drying process, the freeze-dryer product sensor comprising
    ca) a transducer, which generates a measurement signal for the product parameter, and
    cb) an RFID unit comprising a storage unit, wherein the at least one characteristic parameter specific to the freeze-dryer product sensor can be stored,
  wherein
  d) the freeze-dryer product sensor comprises an antenna unit, the antenna unit being coupled to the transducer and to the RFID unit and being able to be used both
    da) for a wireless power supply to the transducer, a wireless excitation of the transducer and a wireless transmission of the measurement signal of the transducer and
    db) for a wireless power supply to the RFID unit, and a wireless transmission of the characteristic parameter specific to the freeze-dryer product sensor stored in the RFID unit.

2. The freeze drying vessel of claim 1, wherein the antenna unit is dimensioned for the wireless power supply to the transducer, the wireless excitation of the transducer and/or the wireless transmission of the measurement signal of the transducer.

3. The freeze drying vessel of claim 1, wherein
  a) a first line branch and a second line branch are present and the antenna unit is permanently connected to the transducer via the first line branch and permanently connected to the RFID unit via the second line branch,
  b) a first filter is arranged in the first line branch, where the first filter processes a signal of the antenna unit for the wireless power supply to the transducer, the wireless excitation of the transducer and/or the wireless transmission of the measurement signal of the transducer and
  c) a second filter is arranged in the second line branch, where the second filter processes a signal of the antenna unit for the wireless power supply to the RFID unit, the wireless excitation of the RFID unit and/or the wireless transmission of the characteristic parameter specific to the freeze-dryer product sensor stored in the RFID unit.

4. The freeze drying vessel of claim 3, wherein another transducer is present and the first filter arranged in the first line branch is dimensioned in such a way that the first filter both
   a) processes the signal of the antenna unit for the wireless power supply to the transducer, the wireless excitation of the transducer and/or the wireless transmission of the measurement signal of the transducer and
   b) processes the signal of the antenna unit for the wireless power supply to the other transducer, the wireless excitation of the other transducer and/or the wireless transmission of the measurement signal of the other transducer,
   c) where the two transducers operate in different frequency bands.

5. The freeze drying vessel of claim 4, wherein a plurality of transducers is provided which are arranged at different heights of the freeze-dryer product sensor.

6. The freeze drying vessel of claim 3, wherein a modulator and a demodulator are arranged in the first line branch and in the second line branch.

7. The freeze drying vessel of claim 1, wherein the at least one characteristic parameter is
   a) a calibration factor,
   b) a calibration curve,
   c) a calibration function or
   d) a calibration map.

8. The freeze drying vessel of claim 1, wherein the drying good is contained in a drying vessel comprising a stopper, a supporting and holding device is employed to mount or fix the freeze-dryer product sensor on the stopper of the drying vessel and
   the antenna unit is realized as the supporting and holding device.

9. The freeze drying vessel of claim 1, wherein the antenna unit has a base impedance and the RFID unit is adapted to the base impedance of the antenna unit.

10. The freeze drying vessel of claim 1, wherein a plurality of transducers is provided which are arranged at different heights of the freeze-dryer product sensor.

11. The freeze drying vessel of claim 1, wherein the antenna unit comprises an antenna and a sleeve.

12. The freeze drying vessel of claim 1, wherein the transducer comprises an oscillating circuit with a quartz crystal, the resonance frequency of the quartz crystal being temperature-dependent.

13. The freeze drying vessel of claim 1, wherein
   a) the RFID unit is excited with an excitation frequency
      aa) of 868 MHz±10 MHz or
      ab) of 915 MHz±10 MHz
   and
   b) the transducer is excited with a carrier frequency in the range of 2.4 GHz to 2.5 GHz.

14. The freeze drying vessel of claim 1, wherein
   a) a first line branch is present and the antenna unit is permanently connected to the transducer via the first line branch,
   b) the transducer operates in a frequency band unique to the transducer, and
   c) in the first line branch a filter is arranged which has a design and dimensions that are not unique to the transducer and that may be shared with at least one filter of another transducer of another freeze-dryer product sensor operating in another frequency band differing from the frequency band of the transducer, the filter being able to process the signal of the antenna unit for the wireless power supply both of the transducer and of the other transducer, the wireless excitation both of the transducer and of the other transducer and/or the wireless transmission of the measurement signal both of the transducer and of the other transducer.

15. A method for operating a freeze-dryer product sensor for use with a freeze dryer containing drying vessels accommodating a drying good having a varying product parameter during a freeze-drying process, the freeze-dryer product sensor having at least one characteristic parameter specific to the freeze-dryer product sensor, and where by means of the freeze-dryer product sensor the product parameter of the drying good can be measured in the drying vessel in the freeze dryer during the freeze-drying process, the freeze-dryer product sensor comprising
   a) a transducer, which generates a measurement signal for the product parameter and which exhibits a transient decaying behavior after having been excited, and
   b) an RFID unit comprising a storage unit, wherein the at least one characteristic parameter specific to the freeze-dryer product sensor can be stored,
   c) an antenna unit, the antenna unit being coupled to the transducer and to the RFID unit and being able to be used both
      ca) for a wireless power supply to the transducer, a wireless excitation of the transducer and/or a wireless transmission of the measurement signal of the transducer and
      cb) for a wireless power supply to the RFID unit, a wireless transmission of the characteristic parameter specific to the freeze-dryer product sensor stored in the RFID unit, and
   d) a first line branch and a second line branch, the antenna unit being permanently connected to the transducer via the first line branch and being permanently connected to RFID unit via the second line branch and
   wherein
   e) an RFID transmitting and/or receiving unit and a transducer transmitting and/or receiving unit are present,
   the method utilizing
   f) an RFID antenna input signal,
   g) an RFID antenna output signal,
   h) a transducer excitation signal, comprising a transducer excitation frequency,
   i) a transducer decay signal,
   j) a carrier signal, and
   k) a transducer antenna input signal, in which the carrier signal and the transducer excitation signal are superimposed, and
   l) a transducer antenna output signal,
   the method comprising the following method steps:
   m) transmitting the RFID antenna input signal to excite the second line branch with the RFID unit by means of the RFID transmitting and/or receiving unit and via the antenna unit,
   n) wirelessly transmitting the RFID antenna output signal in order to transmit the at least one characteristic parameter specific to the freeze-dryer product sensor from the second line branch to the or an RFID transmitting and/or receiving unit via the antenna unit,
   o) transmitting the transducer antenna input signal to excite the first line branch with the transducer by means of the transducer transmitting and/or receiving unit and via the antenna unit,
   p) generating the transducer excitation signal by demodulating the transducer antenna input signal and exciting the transducer with the transducer excitation signal, q) deactivating the excitation of the first line branch with the transducer and in this way deactivating the excitation of the transducer with the transducer excitation signal,
r) generating the transducer decay signal on the basis of the transient decaying behavior of the transducer following its previous excitation with the transducer excitation signal,
s) generating the transducer antenna output signal using the carrier signal to modulate the transducer decay signal into the transducer antenna output signal,
t) biasing the antenna unit with the transducer antenna output signal and
u) wirelessly transmitting the transducer antenna output signal from the antenna unit to the or a transducer transmitting and/or receiving unit.

16. The method of claim 15, wherein
a) the transducer is a first transducer, the first transducer operates in a first frequency band unique to this first transducer, the antenna unit is a first antenna unit and the measurement signal is a first measurement signal,
b) a second freeze-dryer product sensor is present, having at least one second characteristic parameter specific to the second freeze-dryer product sensor and comprising
  ba) a second transducer, by means of which a second product parameter of a second drying good can be measured in a second drying vessel, which generates a second measurement signal for the second product parameter,
  bb) an second RFID unit,
  bc) a first line branch and a second line branch and
  bd) a second antenna unit, the second antenna unit being permanently connected to the second transducer via the first line branch and being permanently connected to second RFID unit via the second line branch and being able to be used both
    bda) for a wireless power supply to the second transducer, a wireless excitation of the second transducer and/or a wireless transmission of the second measurement signal of the second transducer and
    bdb) for a wireless power supply to the second RFID unit, a wireless excitation of the second RFID unit and/or a wireless transmission of the second characteristic parameter specific to the second freeze-dryer product sensor stored in the second RFID unit, and
  be) a second RFID transmitting and/or receiving unit and a second transducer transmitting and/or receiving unit, and
c) in the first line branch of the first transducer a first filter is arranged and in the first line branch of the second transducer a second filter is arranged, the first filter and the second filter having the same designs and dimensions,
the method comprising the method steps of processing the signals of the first antenna unit and of the second antenna unit
  for the wireless power supply of the first transducer and of the second transducer,
  for the wireless excitation of the first transducer and of the second transducer and/or
  for the wireless transmission of the first measurement signal of the first transducer and the second measurement signal of the other transducer
by the first filter and the second filter having the same designs and dimensions.

17. Freeze-dryer product sensor for use in a freeze dryer containing a drying vessel accommodating a drying good having a varying product parameter during a freeze-drying process, the freeze-dryer product sensor having at least one characteristic parameter specific to the freeze-dryer product sensor, where by means of the freeze-dryer product sensor a product parameter of a drying good can be measured in the drying vessel during the freeze-drying process, the freeze-dryer product sensor comprising
a) a transducer, which generates a measurement signal for the product parameter, and
b) an RFID unit comprising a storage unit, wherein the at least one characteristic parameter specific to the freeze-dryer product sensor is stored,
wherein
c) the freeze-dryer product sensor comprises an antenna unit, the antenna unit being coupled to the transducer and to the RFID unit and being able to be used both
  ca) for a wireless power supply to the transducer, a wireless excitation of the transducer and a wireless transmission of the measurement signal of the transducer and
  cb) for a wireless power supply to the RFID unit, a wireless transmission of the characteristic parameter specific to the freeze-dryer product sensor stored in the RFID unit
d) the RFID unit is excited with an excitation frequency of 868 MHz±10 MHz or of 915 MHz±10 MHz and/or the transducer is excited with a carrier frequency in the range of 2.4 GHz to 2.5 GHz,
e) a first line branch and a second line branch are present and the antenna unit is permanently connected to the transducer via the first line branch and permanently connected to the RFID unit via the second line branch,
f) a first filter is arranged in the first line branch, where the first filter processes a signal of the antenna unit for the wireless power supply to the transducer, the wireless excitation of the transducer and/or the wireless transmission of the measurement signal of the transducer,
g) a second filter is arranged in the second line branch, where the second filter processes a signal of the antenna unit for the wireless power supply to the RFID unit, the wireless excitation of the RFID unit and/or the wireless transmission of the characteristic parameter specific to the freeze-dryer product sensor stored in the RFID unit, and
h) the second filter arranged in the second line branch comprises a filter characteristic which is suitable for processing an RFID antenna input signal of the antenna unit for the wireless power supply to the RFID unit, the wireless excitation of the RFID unit and/or the wireless transmission of the characteristic parameter specific to the freeze-dryer product sensor stored in the RFID unit both
  ha) if the RFID antenna input signal excites the RFID unit with an excitation frequency of 868 MHz±20 MHz and
  hb) if the RFID antenna input signal excites the RFID unit with an excitation frequency of 915 MHz±20 MHz.

* * * * *